UNITED STATES PATENT OFFICE.

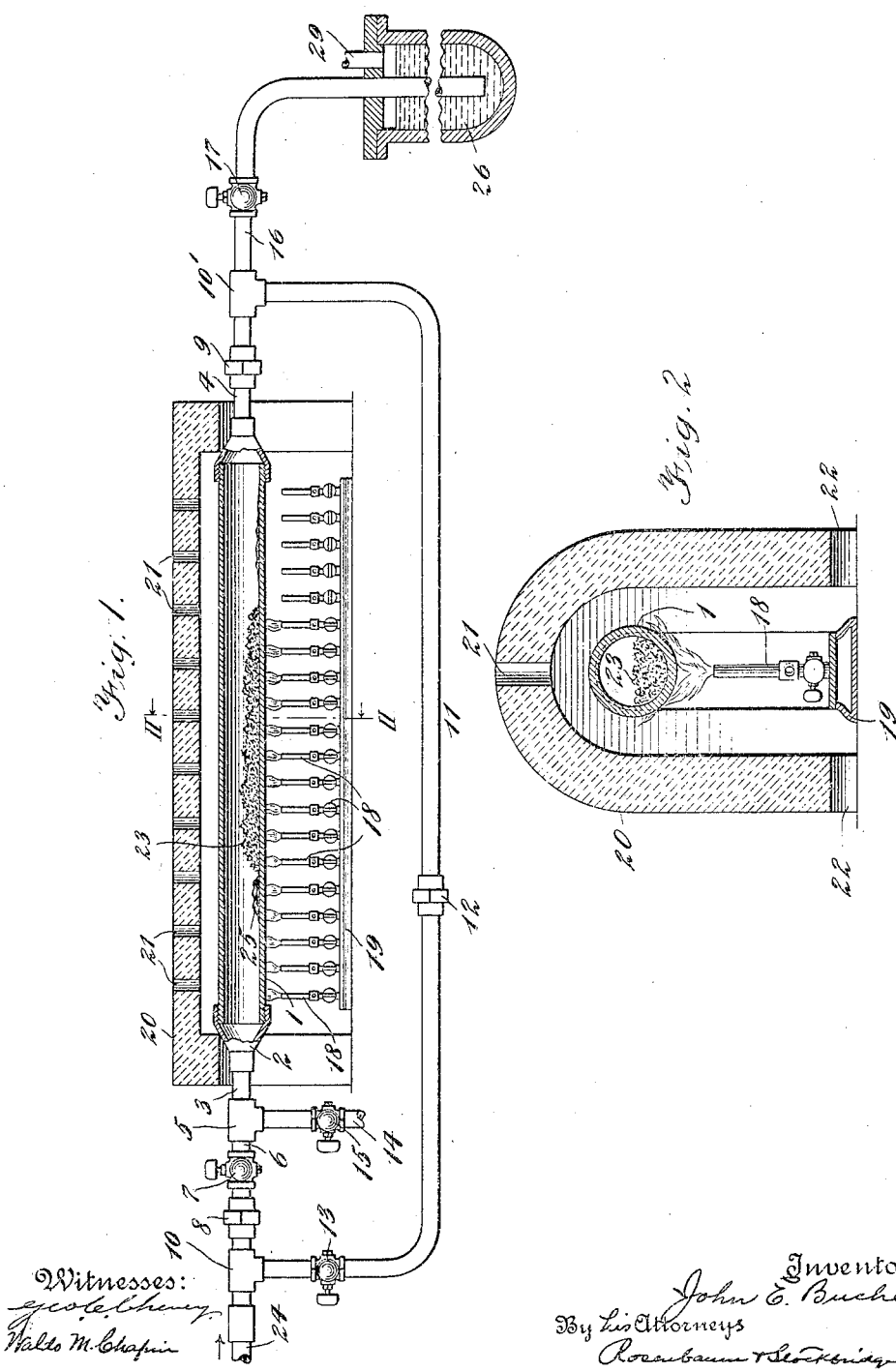

JOHN E. BUCHER, OF COVENTRY, RHODE ISLAND.

SYNTHETIC PRODUCTION OF CYANOGEN COMPOUNDS AND THE LIKE.

1,082,845.  Specification of Letters Patent.  Patented Dec. 30, 1913.

Application filed July 24, 1912. Serial No. 711,211.

*To all whom it may concern:*

Be it known that I, JOHN E. BUCHER, a citizen of the United States, residing at Coventry, in the county of Kent and State of Rhode Island, have invented certain new and useful Improvements in Synthetic Production of Cyanogen Compounds and the like, of which the following is a full, clear, and exact description.

This invention relates to the fixation of nitrogen and more particularly to an improved process of producing cyanogen compounds and derivatives therefrom, together with valuable by-products incident to the production of such a compound or compounds.

The process in question is synthetic in character and, in its preferred form, involves the direct union of the elements forming, for example, alkali cyanids; to-wit, an alkali metal, carbon and nitrogen. Attempts have previously been made to effect this synthesis; but practically none of them have been industrially successful. As an example of the said synthetic processes I may mention that of H. Y. Castner, disclosed in U. S. Patent No. 577,837, dated March 2, 1897, in which molten alkali metal was percolated through charcoal, heated to redness, in the presence of a current of free nitrogen. Robine and Lenglen, in their book on the cyanid industry (Le Clerc's translation) page 143, say: "Castner's process, properly speaking, belongs to that class of methods using atmospheric nitrogen, the only one to which the term synthetic really belongs, but to our knowledge it has never given results permitting its use industrially."

I aim, therefore, to produce among a variety of possible products, commercially pure cyanogen compounds with a maximum of efficiency. These and other objects of my invention will be hereinafter referred to and the novel process and means whereby they may be attained will be more particularly set forth in the appended claims.

Castner evidently believed that all that was necessary if one desired to produce cyanid synthetically from free nitrogen was to bring carbon—*e. g.*, charcoal, metallic sodium and nitrogen together in a receptacle; and the principal things to be observed, according to his process, seem to be to prevent the ingress of air, and to expose a large surface of the alkali metal (see Castner's claims and lines 82-83 of page 1). He distinctly states that if iron be present it is "inert". I have endeavored to so directly combine carbon, free nitrogen and sodium and find that unless a catalyzer be present the direct synthesis cannot be effected to any practicable extent. I have further found that iron is one of the most, indeed if not the most, efficient catalytic agent that can be used in this connection. Further, wood charcoal (referred to in the said Castner patent) as ordinarily obtained, is a very impure form of carbon. Besides the ash invariably present, which is composed largely of oxygen compounds, there may be as high as 14% of oxygen contained in it, even though it has been heated to 1,000° C. (Roscoe and Schorlemmer, vol. 1, p. 592, 1877 edition). This form of carbon is plainly not fitted for use in the synthesis of alkali cyanids which involves the use of sodium or potassium, for example, in free or molecular condition. The oxygen content in whatever form, whether in the charcoal as such, or in combination with other elements as ash, will unite with the alkali metal, forming oxygen compounds such as oxids and carbonates, *e. g.* sodium carbonate. Sodium carbonate gives little or no cyanid when heated with carbon and nitrogen at the moderate red heat preferred for use in connection with my process; and hence that portion of the alkali metal which is thus united with oxygen to form compounds is wasted under such temperature conditions.

I have become aware, as the result of an extensive series of experiments, that sodium carbonate may be converted into sodium cyanid and I have made application for patent hereon, said application being designated Serial No. 726,924, filed October 21, 1912, and entitled Process for fixing atmospheric nitrogen. The present disclosure, however, is more particularly concerned with that phase of the problem which involves the use of metallic sodium, or the like. The latter permits of the employment of relatively low temperatures, whereas with sodium carbonate, for example, a relatively higher temperature is required to combine the sodium of said carbonate with free nitrogen and carbon in the presence of iron. In order to permit of the use of these lower temperatures ranging from about an incipient cherry-red heat (800° C.) down to incipient red heat (525° C.) or even somewhat below the latter, it is therefore desirable to use the alkali metal in metallic form rather than as an element of a compound including oxygen as a constituent thereof.

It will be apparent from the foregoing that it is desirable when using alkali metal, in contradistinction to alkali metal compounds, for the economic production of alkali cyanids by synthesis, to exclude oxygen from whatever source.

The accompanying drawing exemplifies one of many forms of apparatus in or by means of which my novel process may be effectuated. I am aware, however, that various modifications and changes may be made in both the process and apparatus, within the purview of my invention, and hence desire to be limited only by the scope of the claims appended hereto.

The apparatus herein described is substantially the same as that described in my application relating to a process for purifying metals, said application having been filed in the United States Patent Office February 8, 1912, and being there designated Serial Number 676,399.

Referring to the accompanying drawing, which forms a part hereof and in which like reference characters designate like parts in the respective views, Figure 1 is a side elevation of an apparatus wherein my process may be carried out, one side of the muffle surrounding the retort being removed for purposes of illustration. Fig. 2 is a section of said apparatus taken on line 2—2 of Fig. 1.

A section of heavy weight iron pipe 1 is provided at either extremity thereof with a reducing cap 2, the reduced extremities of these pipes being respectively connected to pipes 3 and 4, the latter being preferably of considerably smaller diameter than the section 1. A T 5 is connected to the outer extremity of the small pipe or nipple 3, and a nipple 6 of the same diameter may be tapped into the opposite side of the T 5. Nipple 6 is connected to a cock 7, which in turn is connected to a coupling 8. The nipple or pipe section 4 is also correspondingly connected to a coupling 9. Two T's 10—10', one of which is disposed upon either side of the retort formed by the tube 1, are connected respectively with couplings 8 and 9 in any suitable manner, while a U-shaped pipe connection 11, having therein a coupling 12 and cock 13, affords a by-pass around the retort. Downwardly extending from the T 5 is a pipe connection 14 having therein a cock 15 and laterally extending from the T 10' is a connection 16 in which is a cock 17. The retort 1 may be heated in any suitable manner, as by means of a series of Bunsen burners 18 which for convenience may be mounted upon a common base 19 in a well known manner. A muffle or screen 20 of fire brick, or the like, preferably having substantially the form of an inverted U, may surround the retort and its burners. Suitable vents 21, for the escape of gases of combustion, and apertures 22 for the admission of air, should preferably be provided at intervals along the length of the muffle.

Assuming that iron is the catalytic material used, a suitable quantity thereof may be disposed substantially in the middle of the retort as indicated at 23. I find in practice that if the iron be finely divided, e. g., pulverulent or fibrous, the reactions are effected more rapidly than if the said metal be in larger masses. The reaction, however, may be made so vigorous as to de-carburize solid masses of steel, in which case, of course, the catalytic agent is the iron present in the steel. I have also successfully treated pig-iron herein. The catalytic metal preferably thoroughly and intimately mixed with pulverulent carbon, e. g., graphite so that the extended surface of the catalytic metal may be well in contact with the carbon, as hereinafter described, may be introduced into the retort by unscrewing one of the reducers 2, and I similarly introduce at one end of the retort a quantity of alkali metal, e. g., sodium.

Nitrogen is introduced into the retort via a pipe 24 which is in communication with the T 10, upon the left-hand side of the device, as shown in Fig. 1; and if the cocks 7 and 17 be opened, and cocks 13 and 15 be closed, the gaseous nitrogen will pass through a coupling 8 and connected parts directly into the retort. Herein it is rapidly heated to a temperature preferably slightly above the boiling point of sodium, if that be the alkali metal used. As the hot nitrogen passes over the sodium designated 25, the latter vaporizes thereinto and passes, together with the nitrogen, through or over the catalytic metal or material 23. The carbon may also be supplied by injecting hydrocarbons, e. g. petroleum, through pipe 24, together with the nitrogen; the use of such carbonaceous materials being hereinafter more fully discussed.

In the device shown, 20 burners have been somewhat diagrammatically indicated and in practice a few of these at the extremity of the retort from which the current of nitrogen emerges, are unlighted. Thus, for example, 15 gas jets may be ignited, and 5 burners may be left unlighted. As a result the said extremity of the retort from which the nitrogen emerges is cooler than other portions of the same and is preferably at a temperature below the boiling point of the alkali metal, e. g., sodium, so that any sodium which passes through the mass of catalytic material will, upon entering this relatively cool end of the retort, be deposited. This procedure results in a saving of the alkali metal which accumulates in this relatively cool extremity of the retort and is there held until the current of nitrogen is reversed, in the manner hereinafter described. The nitrogen or argon which passes out of the apparatus should preferably be quite cool, and as it passes off through the cock 17, it may be collected in any suitable manner to avoid waste. After substantially all of the sodium, if sodium be the alkali metal employed, has been transferred from one end of the retort to the other, the cocks 7 and 17 are closed and those designated 13 and 15 are opened. Thereafter the nitrogen will pass downwardly from T 10 and around a by-pass 11 to T 10', and thence through the retort 1 in a reverse direction to that in which it previously flowed therethrough. It will be understood that before so reversing the current of gas, the burners 18, which had previously been unlighted are now lighted, and a corresponding number at the other extremity of the retort are turned off. As a result, the cool section or portion of the retort is reversed from one extremity of the latter to the other, so that the previously deposited sodium, for example, will be reevaporated and will again be carried through or over the catalytic material, by the nitrogen current, to be deposited thereafter at the end of the retort from whence it originally came. The flow of nitrogen through the retort may thus be reversed at intervals until substantially all of the alkali metal has been used up. It is obvious that this metal may be introduced into the retort or vessel either in liquid or in solid form, or it may be introduced as a vapor. My experiments indicate that the higher the temperature of the operation the more rapid the effectuation of the process. There are, however, limits beyond which it would be undesirable to go.

In operating the apparatus herein particularly described, the temperature was maintained by means of the burners at from 700° to 800° C. I have found, however, that where the iron was in finely divided condition, and where the carbon was present in proper proportion to the iron, and especially where the said carbon was in the form of graphite, the reactions took place so vigorously that some of the iron was melted into globules, which would indicate that the temperature of some of the iron had been raised to the neighborhood of 1200° C., at least. Under these last mentioned conditions, the demand for nitrogen is so great that a rapid stream of the same must be passed into the retort, as the reactions tend to form a partial vacuum therein and it is necessary in such case to guard against a flow of gas back through the cock 17. To this end a liquid seal 26, or the like, may be provided. With correct proportions of atmospheric nitrogen, carbon and sodium, in the foregoing case, and with the iron actively present greatly in excess of the active carbon present, the small quantity of gas escaping through the tube 29 was practically pure argon, substantially all of the nitrogen having been greedily absorbed.

Argon may practically only be obtained, of course, from atmospheric nitrogen, and it is assumed that this latter has been obtained by separating it from the oxygen of the air by any suitable process, of which several commercially practicable ones are known to me. Where an excess of nitrogen passes through the apparatus, it may be collected and may thus be used repeatedly until it has all been consumed. Should it be found in practice that any waste of sodium, for example, is taking place, it is merely necessary to refrigerate (as by means, for example, of currents of air) the extremity of the retort from which the nitrogen flows, to such an extent that the temperature of the same will be materially below the boiling point of the alkali metal. It may be here observed, too, that it is advantageous, in such case, to carry out the process under a pressure considerably above atmospheric. This feature is of especial advantage when the nitrogen current must be forced through the mass of catalytic material.

After many experiments and much research, I have found that carbon suitable for use in this synthetic process of producing alkali cyanids may also be obtained by heating impure carbon in the electric furnace. It is not necessary to carry the temperature in the electric furnace so high as to produce graphite. In fact, the temperature required is only that sufficient to drive off oxygen and oxygen compounds including ash. Graphite is, however, as I have previously intimated, especially available for use in the process. Many forms of lamp-black also, after being heated to a white heat contain very little oxygen and are well adapted for the purpose. Carbon deposited by or obtained from the decomposition of hydrocarbons at a red heat is also admirably suited for my process.

Hydrocarbon vapors, such as those obtained from petroleum oils, benzene, $(C_6H_6)$ or other hydrocarbons substantially free from oxygen, may be introduced into the retort.

It is essential that an intimate mixture of or contact between the alkali metal, nitrogen, carbon, and the catalytic agent, be effected. Iron which is the preferred catalytic agent, is preferably in the form of reduced iron, powdered iron, iron filings, iron turnings, or any form of iron or steel exposing a large surface; and to such iron I broadly apply the term "finely divided". It may be here noted that it is of great importance that a relatively large quantity of the catalytic metal be provided in proportion to the quantity of carbon actively present. The carbon may be deposited upon the extended surface of the catalytic metal in a practically pure state and in an excellent physical condition for use in the process. Moreover, under suitable conditions, the carbon may be deposited in a coherent form and will cling to the surface of the iron or steel thus allowing the cyanid formed thereupon to separate from the mass in a clean condition practically free from suspended carbon. The carbon, however, may or may not be deposited previously to the introduction of the alkali metal and nitrogen, as desired. The hydrocarbon vapor may be passed over the finely divided iron or steel simultaneously with the vapor of the alkali metal and nitrogen; or, the hydrocarbon, for instance, petroleum oil, may be sprayed or injected into the apparatus with the current of nitrogen. It is not necessary to have the catalytic material e. g., iron or steel, present in finely divided condition upon which to deposit the carbon, or in contact therewith; although the formation of alkali cyanid is much more rapid when the catalytic material is in such condition as to present an extended catalytic surface to the cyanid forming element.

If the apparatus is made of steel, or if steel turnings or other finely divided forms of steel are present, the carbon of the steel is taken away by the alkali metal and nitrogen, in the form of alkali cyanid and the steel is changed to substantially pure iron. The carbon combined with the iron in steel, seems to be especially well suited to enter into combination with alkali metal and nitrogen at the proper temperature; but in any event, the presence of large amounts of finely divided iron or steel relative to the quantity of reacting substances present favors the rapid formation of alkali cyanid at a red heat. The formation of alkali cyanid, under the above named conditions, is so rapid that it is only necessary to bring a portion of the mixture of carbon, alkali metal and nitrogen into the presence of a relatively large amount of finely divided iron heated to an incipient, or very low red heat, to effect an almost immediate reaction. The catalytic agent, e. g., iron may be pulverized or fibrous, and the reaction or reactions are effected with much greater rapidity under such conditions than when the catalyzer is present in solid thick masses. Of course when the carbon is combined with the catalytic element or material, as in iron carbid, the reaction effected removes the carbon from the carbid and leaves the iron to thereafter act as a true catalyzer.

The synthesis or formation of alkali cyanid being an exothermic reaction, sufficient heat is developed thereby to continue the reaction so long as the necessary elements (alkali metal, carbon and nitrogen) are supplied. The initial temperature necessary may be attained by externally heating the reaction vessel, or by heating a portion of the mixture in any desired manner to the proper temperature. On an industrial scale, if external heating be the method used, it is desirable to have the walls of the reaction vessel as thin as practicable in order to attain the necessary internal temperature as quickly and as economically as possible.

Care must be taken to remove all the oxygen gas from the nitrogen used, because any oxygen entering with the nitrogen will combine with the alkali metal, thus reducing by just so much the yield of cyanid at the relatively low and economical temperature employed.

The alkali metal may be sodium, potassium or lithium, or any mixture of these. Lithium, of course, produces lithium cyanid, or the like, but I prefer to use commercially pure sodium, or an alloy of sodium with a heavy metal such as lead. Lithium reacts with the elements carbon, nitrogen and iron as follows:—

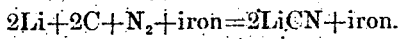

I have not as yet been able to ascertain whether the catalytic agent e. g., iron, is as necessary in the case of lithium as with sodium or potassium; but consider that the catalyzer is of value despite the fact that lithium forms a nitrid, Li$_3$N, which might then react with carbon to form cyanid, even in the absence of iron. I find that on heating calcium to a high temperature with nitrogen, carbon and iron, some cyanid is produced, but the quantity is in no way to be compared to that produced by the aid of the alkali metals under similar conditions. If the elements entering into the synthesis of alkali cyanids are brought together under pressure higher than ordinary atmospheric pressure, the formation of cyanid is hastened and the capacity of the apparatus is increased. If an alloy of the alkali metal, as for instance, lead-sodium alloy, be used, the sodium may be separated from the alloy in any suitable manner as, for example, in the form of vapor, the latter being preferably obtained by blowing nitrogen through the alloy at a suitable temperature.

The nitrogen used in the process may be obtained by any suitable process; as,—from ordinary combustion gases; from liquid air; by abstracting the oxygen from atmospheric air by means of metals; as a waste product of certain chemical industries; etc. If the nitrogen is prepared from atmospheric air it will contain approximately one per cent. of argon, mixed with small quantities of other inert gases such as helium, krypton, neon and xenon, which are unchanged by the process of alkali metal cyanid synthesis; and said gases may be allowed to escape from the apparatus at a suitable point and may be collected in a suitable manner, for use in a substantially pure form.

In my co-pending application, Serial No. 676,399, filed February 8, 1912, I have considered more particularly the decarburization of steel by means of the reactions which result in the formation of cyanid or the like, both at temperatures below the melting point of iron, for example, and at temperatures above the same. I hence do not desire to be limited to a cherry red heat for the upper limit of temperature in my process, except by an express limitation in the claim, while I find that in many cases the process can be effected at a dull red heat or even somewhat lower.

The temperature of the operation may in some cases range as low as 500° C., but as this temperature is approached the reaction is less vigorous and so becomes commercially impractical. On the other hand while the reaction may be effected at relatively high temperatures, such for example as clear orange heat, I prefer to operate at a temperature of less than, let us say, 1100° C., owing to the difficulty and cost of operating commercially for extended periods at higher temperatures, the cost of operation including, of course, the initial cost of the apparatus used, the up-keep of the same, and the cost of fuel or electrical energy used for developing the operating temperature.

Owing to the exothermic character of the reaction the reacting materials may effect an elevation of their own temperature in portions of the mass, but as far as practicable the bulk of the substances participating in the formation of the product sought are preferably maintained at a temperature between the limits stated.

As to just what reactions and inter-reactions take place resulting in the carbon present, from whatever source, uniting with the nitrogen to form the radical CN, I am unable to positively state. Apparently, an iron carbid, or, in some cases, a solution of carbon in iron, is first formed, which carbid, or solution, together with the iron carbid already present, if any, then reacts with nitrogen and sodium, or like metal or element present which is capable of forming the base of a cyanogen compound which is stable at the temperature of the operation, the iron being eliminated from the compound or compounds formed, and the metallic iron thus produced being substantially pure. The solution of carbon in iron may, of course, be either in solid or molten form. The foregoing, however, is merely my theory, and I do not wish to be limited thereto in any way.

Where the word "reaction" occurs in the claims, unless qualified by the adjective "direct," or the like, I intend it to be understood that such term not only includes a simple or direct reaction but a complex reaction wherein possibly several subsidiary reactions occur; this provision being obviously necessitated by the lack of exact knowledge as to just how the molecules of the several elements involved behave with respect to each other. Where the alkali metal, for example, is used in the form of an alloy, it is still to be regarded as in the free or uncombined condition; being uncombined chemically; while this term obviously applies also to sodium or potassium vapor and the like.

The term "iron" is to be regarded as of sufficient breadth to cover not only pure iron but also the iron present in cast iron, steel, or the like, since during the operation cast iron, for example, will speedily be deprived of its carbon, both combined and uncombined, and will be converted to substantially pure iron as described in my said application Serial No. 676,399; and whether the iron be in the form of pure iron and the carbon, mixed or in contact therewith, be supplied from a carbonaceous reagent such as petroleum or graphite, or whether steel or cast iron be used as the source of the catalytic metal and in part at least as the source of carbon, in either case the iron may properly be described as being intimately associated with carbon.

As previously stated, it is advisable to exclude oxygen from participation in the reaction and I also deem it desirable to, in like manner, exclude sulfur and like substances in order that the reactions involved may be as direct, and the production of the cyanogen compound as truly synthetic in character as may be commercially practicable. Finally, it should be stated that the herein-described process is so efficient that the yield of cyanid, for example, obtainable thereby is considerably in excess of fifty per cent. of that theoretically possible. Indeed in some cases this yield closely approximates 100%. In other words, it is possible to "fix" substantially all of the atmospheric nitrogen introduced into the apparatus and to obtain not alone the cyanogen compound sought, but also substantially pure argon as a by-product. Indeed, it is possible to quantitively combine substantially all sodium, carbon and nitrogen introduced into the apparatus, provided that proper conditions be observed and proper proportions of the constituent elements of the cyanogen compound to be formed, be provided, and the liquid cyanid may then be drained or flowed off from the residues of the reaction, or it may be removed from the iron, for example, by lixiviation or in any other desired manner. The product is quite free from sulfids, ferrocyanids and the like when the process is properly conducted.

When the source of carbon is a hydrocarbon such as petroleum oil or benzene, as previously indicated, it is possible to operate the process very economically by utilizing the hydrogen given off from the reacting mass to obtain a fresh supply of nitrogen from the air, preparatory to repeating the cycle. Thus:

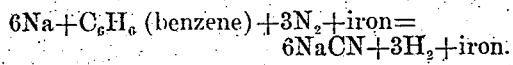

This equation representing merely the result rather than the possible successive steps which may be involved. Burning the hydrogen with air, we obtain atmospheric nitrogen, the oxygen combining of course with the hydrogen to form water. The nitrogen which remains, may then be utilized in the process in the manner previously described.

Having described my invention, I claim:—

1. The synthetic process of producing cyanid which comprises effecting a vigorous exothermic reaction between an alkali metal in molecular condition, free nitrogen and carbon, whereby to directly form cyanid of said metal, said reaction being effected through the intermediacy of iron intimately commingled with said carbon, the iron acting as a catalytic agent, said reaction to yield at least fifty per cent. of the yield theoretically possible from the amounts of carbon, nitrogen and alkali metal present, the bulk of the substances participating in said reaction being heated to a temperature in excess of 500° C. and less than 1100° C.

2. The synthetic process of producing an alkali metal cyanid which comprises effecting a vigorous exothermic reaction between free alkali metal, atmospheric nitrogen substantially free from oxygen, and carbon, whereby to directly form said cyanid, said reaction being effected through the intermediacy of iron intimately commingled with said carbon, the iron acting as a catalytic agent.

3. The synthetic process of producing an alkali metal cyanid which comprises effecting a vigorous exothermic reaction between free alkali metal, atmospheric nitrogen substantially free from oxygen, and carbon, whereby to directly form said cyanid, said reaction being effected through the intermediacy of iron intimately commingled with said carbon, the iron acting as a catalytic agent, said reaction to yield at least fifty per cent. of the yield theoretically possible from the amounts of carbon, nitrogen and alkali metal present.

4. The synthetic process of producing an alkali metal cyanid which comprises effecting a vigorous exothermic reaction between free alkali metal, atmospheric nitrogen substantially free from oxygen, and carbon, whereby to directly form said cyanid, said reaction being effected through the intermediacy of iron intimately commingled with said carbon, the iron acting as a catalytic agent, said reaction to yield at least fifty per cent. of the yield theoretically possible from the amounts of carbon, nitrogen and alkali metal present, the substances participating in said reaction being heated preparatory to said reaction to a temperature in excess of 500° C. and less than 1100° C.

5. The synthetic process of producing an alkali metal cyanid which comprises effecting a vigorous exothermic reaction between free alkali metal, atmospheric nitrogen substantially free from oxygen, and carbon, whereby to directly form said cyanid, said reaction being effected through the intermediacy of iron intimately commingled with said carbon, the iron acting as a catalytic agent, the substances participating in said reaction being heated preparatory to said reaction to a temperature in excess of 500° C.

6. The synthetic process of producing cyanid which comprises effecting a vigorous exothermic reaction between an alkali metal in molecular condition, free nitrogen, and carbon, whereby to directly form cyanid of said alkali metal, said reaction being effected through the intermediacy of iron presenting an extended surface in proportion to the volume of the same, said surface being in intimate contact with said carbon, the iron acting as a catalytic agent, said reaction to yield at least fifty per cent. of the yield theoretically possible from the amounts of carbon, nitrogen and alkali metal present, the bulk of the substances participating in said reaction being heated to a temperature in excess of 500° C.

7. The synthetic process of producing an alkali metal cyanogen compound which comprises effecting a substantially direct reaction between atmospheric nitrogen substantially free from oxygen, free alkali metal, and a carbonaceous reagent, by bringing said substances into intimate contact with each other and with iron, the latter acting as a catalyst agent and initially heating them to a temperature in excess of 500° C.

8. The synthetic process of producing an alkali metal cyanogen compound which comprises effecting a substantially direct reaction between atmospheric nitrogen, substantially free from oxygen, free alkali metal, and a carbonaceous reagent, by bringing said substances into intimate contact with each other and with iron, the latter acting as a catalytic agent and initially heating them to a temperature in excess of 500° C., the carbonaceous reagent being substantially free from oxygen.

9. The synthetic process of producing an alkali metal cyanogen compound which comprises effecting a substantially direct reaction between atmospheric nitrogen, substantially free from oxygen, free alkali metal, and a carbonaceous reagent, by bringing said substances into intimate contact with each other and with iron, the latter acting as a catalytic agent and initially heating them to a temperature in excess of 500° C., sulfur being substantially excluded from participation in said reaction.

10. The synthetic process of producing an alkali metal cyanogen compound which comprises effecting a substantially direct reaction between free nitrogen, free alkali metal, and a carbonaceous reagent, by bringing said substances into intimate contact with each other and with iron the latter acting as a catalytic agent and initially heating them to a temperature in excess of 500° C., both oxygen and sulfur being substantially excluded from participation in said reaction.

11. The synthetic process of producing a cyanogen compound of sodium, which comprises effecting a substantially direct reaction between atmospheric nitrogen, substantially free from oxygen, metallic sodium, and carbon, in the presence of iron, the carbon also being substantially free from oxygen.

12. The synthetic process of producing a cyanogen compound of an alkali metal, which comprises effecting a substantially direct reaction between atmospheric nitrogen, substantially free from oxygen, the alkali metal of the compound sought, in free and molecular condition, and a carbonaceous reagent which is substantially free from oxygen, in the presence of iron, acting as a catalytic agent.

13. The synthetic process of producing a cyanogen compound of an alkali metal, which comprises effecting a substantially direct reaction between atmospheric nitrogen under pressure and substantially free from oxygen, the alkali metal of the compound sought, in free and molecular condition, and a carbonaceous reagent which is substantially free from oxygen, in the presence of iron, acting as a catalytic agent.

14. The synthetic process of producing a cyanogen compound of an alkali metal, which comprises effecting a substantially direct reaction between atmospheric nitrogen, substantially free from oxygen, the alkali metal of the compound sought, in free and molecular condition, and a carbonaceous reagent which is substantially free from oxygen, in the presence of and intimately in contact with finely divided iron, the latter acting as a catalytic agent.

15. The process of producing a cyanogen compound of an alkali metal, which comprises effecting an exothermic reaction, at a temperature above 500° C., in which the elements nitrogen, iron, carbon, and the alkali metal of the compound sought participate, the iron actively present being in excess of the active carbon present and acting as a catalytic agent.

16. The process of producing a cyanogen compound of an alkali metal, which comprises effecting an exothermic reaction, from participation in which oxygen is substantially excluded, at a temperature above 500° C., and in which reaction the elements nitrogen, iron, carbon, and the alkali metal of the compound sought take part, the iron actively present being materially in excess of the active carbon present and the nitrogen being supplied in free and molecular condition.

17. The synthetic process of producing a cyanogen compound of an alkali metal which comprises effecting a substantially direct reaction between atmospheric nitrogen, free alkali metal and carbon in the presence of iron, the last two mentioned elements being intimately associated initially and the iron actively present being in excess of the active carbon present.

18. The process of obtaining a cyanogen compound which comprises passing a current of atmospheric nitrogen through a heated mass of intimately associated iron and carbon while said mass is also in contact with free alkali metal, and effecting a vigorous exothermic reaction between said substances whereby to substantially directly form a cyanogen compound of said alkali metal, and separating said compound from the residue of said reaction by withdrawing it therefrom in liquefied condition.

19. The process of obtaining a cyanogen compound which comprises passing a current of atmospheric nitrogen through a heated mass of intimately associated iron and carbon while said mass is also in contact with free alkali metal, and effecting a vigorous exothermic reaction between said substances whereby to substantially directly form a cyanogen compound of said alkali metal, and separating said compound from the residue of said reaction.

20. The process of producing a cyanogen compound of an alkali metal, which comprises effecting an exothermic reaction, from participation in which oxygen is substantially excluded, and in which reaction the elements nitrogen, iron, carbon, and the alkali metal of the compound sought take part, the iron actively present being materially in excess of the active carbon present and the nitrogen being supplied in free and molecular condition.

In witness whereof, I subscribe my signature, in the presence of two witnesses.

JOHN E. BUCHER.

Witnesses:
WALDO M. CHAPIN,
WILLIAM C. LARY.